US012023954B1

(12) United States Patent
Alkhateeb et al.

(10) Patent No.: US 12,023,954 B1
(45) Date of Patent: Jul. 2, 2024

(54) COMBINATION MARKER AND ERASER

(71) Applicant: KING FAISAL UNIVERSITY, Al-Ahsa (SA)

(72) Inventors: Ibrahim Abdullah Alkhateeb, Al-Ahsa (SA); Abdullah Mohammed Aladsani, Al-Ahsa (SA); Fahad Ahmed M. Alnaim, Al-Ahsa (SA)

(73) Assignee: KING FAISAL UNIVERSITY, Al Hasa (SA)

( * ) Notice: Subject to any disclaimer, the term of this patent is extended or adjusted under 35 U.S.C. 154(b) by 0 days.

(21) Appl. No.: 18/531,068

(22) Filed: Dec. 6, 2023

(51) Int. Cl.
*B43K 29/02* (2006.01)
*B43K 23/08* (2006.01)

(52) U.S. Cl.
CPC .............. *B43K 29/02* (2013.01); *B43K 23/08* (2013.01)

(58) Field of Classification Search
CPC ........ B43K 29/02; B43K 23/08; B43K 29/00; B43K 29/18; B43K 29/002; B43K 29/003; B43K 29/004; B43K 29/007; B43K 29/05
USPC ............. 401/52, 195; 15/424, 426, 427, 434
See application file for complete search history.

(56) References Cited

U.S. PATENT DOCUMENTS

| | | | | |
|---|---|---|---|---|
| 4,963,048 | A * | 10/1990 | Thomas | B43K 24/04 401/99 |
| 5,855,442 | A | 1/1999 | Keller | |
| 6,056,468 | A | 5/2000 | Niewiadomski | |
| 6,171,005 | B1 * | 1/2001 | Kuo | B42D 5/04 401/52 |
| 6,375,376 | B1 * | 4/2002 | Hsu | B43K 29/007 401/243 |
| 6,565,275 | B2 | 5/2003 | Brand et al. | |
| 7,350,995 | B1 | 4/2008 | Rhodes | |
| 2010/0080645 | A1 | 4/2010 | Wu | |
| 2011/0038661 | A1 | 2/2011 | Giap et al. | |
| 2015/0360503 | A1 | 12/2015 | Velkovski | |

FOREIGN PATENT DOCUMENTS

CN 209063761 U 7/2019

OTHER PUBLICATIONS

"Magnatag®"; printed on Oct. 18, 2023 from https://www.magnatag.com/item/EPH-4.

(Continued)

*Primary Examiner* — David J Walczak
(74) *Attorney, Agent, or Firm* — Nath, Goldberg & Meyer; Richard C. Litman

(57) ABSTRACT

The combination marker and eraser includes both a marker, such as those used with erasable whiteboards and marker-boards, for example, and an eraser for the marker combined in a single writing implement. The combination marker and eraser includes the marker and a hollow housing. The body of the marker is received within the hollow housing such that the writing tip of the marker is positioned exterior to the hollow housing. A strip of eraser material is attached to an exterior surface of the hollow housing. The combination marker and eraser further includes an outer shell rotatably mounted about the hollow housing. The outer shell has a slot formed therethrough such that rotation of the outer shell with respect to the hollow housing selectively either covers the strip of eraser material or exposes the strip of eraser material through the slot.

9 Claims, 2 Drawing Sheets

(56) References Cited

OTHER PUBLICATIONS

"GoDryErase.com Dry Erase Marker with Eraser Cap"; printed on Oct. 18, 2023 from https://godryerase.com/dryermawierc5.html.
"Artline 577 Whiteboard Marker & Magnetic Eraser"; printed on Oct. 18, 2023 from https://www.winc.com.au/main-catalogue-productdetail/artline-577-whiteboard-marker-magnetic-eraser/87261352.
"Ikea® MÅLA Whiteboard pen with holder/eraser"; printed on Oct. 18, 2023 from https://www.ikea.com/us/en/p/mala-whiteboard-pen-with-holder-eraser-mixed-colors-90477620/.
"Board marker 3mm, magnetic, with eraser, multifunction ico markeraser blue"; printed on Oct. 18, 2023 from https://pepita.com/board-flipchart-markers-c5112/board-marker-3mm-magnetic-with-eraser-multifunction-ico-markeraser-blue-p2038342#ref.

* cited by examiner

COMBINATION MARKER AND ERASER

BACKGROUND

Field

The disclosure of the present patent application relates to writing implements, and particularly to a single writing implement which includes both a marker, such as those used with erasable whiteboards and markerboards, for example, and an eraser for the marker.

Description of Related Art

A whiteboard (also known as a "markerboard" or a "dry-erase board") is a usually white surface for making non-permanent markings. Whiteboards are used with special markers (typically called "whiteboard markers" or "dry erase markers") which are non-permanent markers for applying an erasable ink that adheres to the writing surface of the whiteboard without binding to, or being absorbed by, the surface. Since the ink is not absorbed or bound, it can be easily erased from the surface by wiping with a fabric material. Common whiteboard erasers have a backing layer for gripping and an erasing surface, often made of felt, soft cloth, foam or the like. Whiteboard erasers are typically made to be the same size and shape as blackboard erasers and, similar to blackboard erasers, must be stored in a nearby location when not in use, such as on a shelf attached to the whiteboard or on a nearby table or stand. Since the marker and the eraser are separate articles, it can sometimes be difficult or inconvenient for the user to swap one for the other. Thus, a combination marker and eraser solving the aforementioned problems is desired.

SUMMARY

The combination marker and eraser includes both a marker, such as those used with erasable whiteboards and markerboards, for example, and an eraser for the marker combined in a single writing implement. The combination marker and eraser includes the marker and a hollow housing. The body of the marker is received within the hollow housing such that the writing tip of the marker is positioned exterior to the hollow housing. The hollow housing has an open upper end and may have a closed lower end, providing a base upon which the body of the marker rests. The hollow housing may be fixedly secured to the marker, such as by, but not limited to, frictional engagement, adhesives, molding during manufacture or the like.

A strip of eraser material is attached to an exterior surface of the hollow housing. The strip of eraser material may be formed from any suitable type of material used to erase ink from a marker, as is well-known in the field of whiteboard and markerboard erasers. The combination marker and eraser further includes an outer shell rotatably mounted about the hollow housing. The outer shell has a slot formed therethrough such that rotation of the outer shell with respect to the hollow housing selectively either covers the strip of eraser material or exposes the strip of eraser material through the slot. Thus, when the user is writing with the marker, the outer shell may be rotated to cover the strip of eraser material. When the user wishes to erase something, the outer shell may be rotated to align the slot with the strip of eraser material, thus exposing the strip of eraser material.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
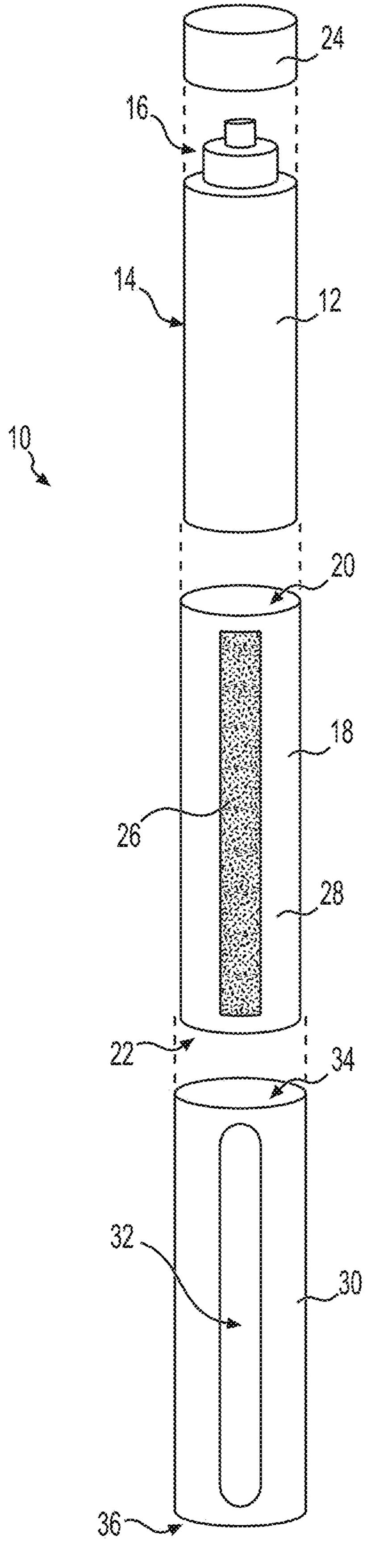
FIG. 1 is an exploded perspective view of a combination marker and eraser.

As shown in FIG. 1, the combination marker and eraser 10 includes both a marker 12, such as those used with erasable whiteboards and markerboards, for example, and an eraser 26 for the marker 12 combined in a single writing implement. The combination marker and eraser 10 includes the marker 12 and a hollow housing 18. It should be understood that marker 12 is shown for exemplary purposes only, and that any suitable type, shape or configuration of marker 12 may be used. As is conventionally known, marker 12 may include a cap 24 for releasably covering a writing tip 16 of the marker 12.

The body 14 of the marker 12 is received within the hollow housing 18 such that the writing tip 16 of the marker 12 is positioned exterior to the hollow housing 18. The hollow housing 18 has an open upper end 20 (through which the writing tip 16 projects) and may have a closed lower end 22, providing a base upon which the body 14 of the marker 12 rests. The hollow housing 18 may be fixedly secured to the marker 12, such as by, but not limited to, frictional engagement, adhesives, molding during manufacture or the like. For the conventional cylindrical body 14 of marker 12 shown in the non-limiting example of FIG. 1, the hollow housing 18 has a matching cylindrical contour and is dimensioned such that marker 12 tightly fits therein, covering the body 14 of marker 12 but leaving the writing tip 16 exposed.

Figure 2B:
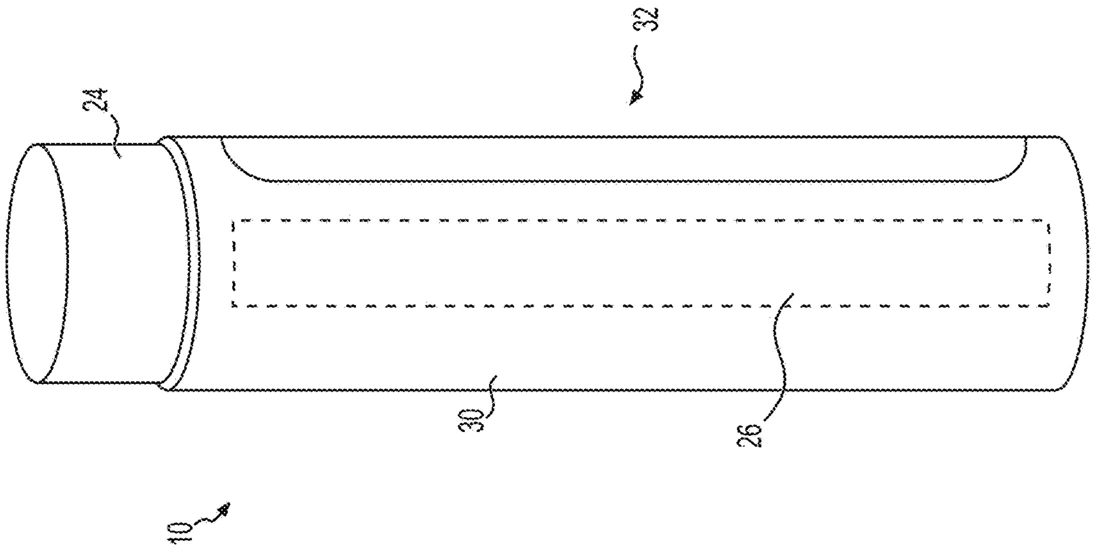
FIG. 2B is a perspective view of the combination marker and eraser, showing the combination marker and eraser in a writing configuration in which the eraser is covered.
Figure 2A:
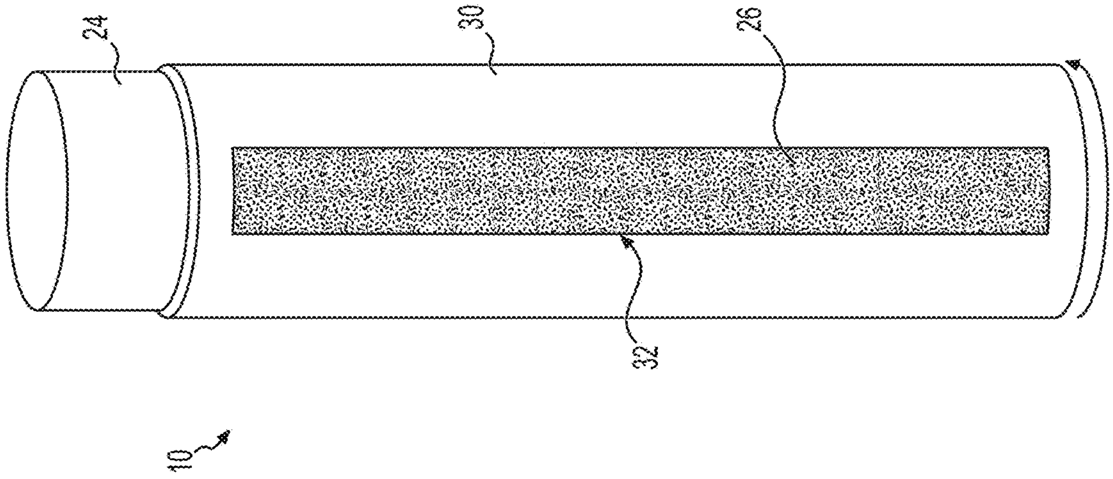
FIG. 2A is a perspective view of the combination marker and eraser, showing the combination marker and eraser in an erasing configuration in which the eraser is exposed.

A strip of eraser material 26 is attached to an exterior surface 28 of the hollow housing 18 using adhesives or the like. The strip of eraser material 26 may be formed from any suitable type of material used to erase ink from a marker, as is well-known in the field of whiteboard and markerboard erasers. The combination marker and eraser 10 further includes an outer shell 30 rotatably mounted about the hollow housing 18. The outer shell 30 has a slot 32 formed therethrough such that rotation of the outer shell 30 with respect to the hollow housing 18 selectively either covers the strip of eraser material 26 or exposes the strip of eraser material 26 through the slot 32. Thus, as shown in FIG. 2A, when the user wishes to erase something, the outer shell 30 may be rotated to align the slot 32 with the strip of eraser material 26, thus exposing the strip of eraser material 26 for use. When the user is writing with the marker 12, the outer shell 30 may be rotated to cover the strip of eraser material 26, as shown in FIG. 2B.

For the conventional cylindrical body 14 of marker 12 shown in the non-limiting example of FIG. 1, the outer shell 30 has a cylindrical contour and is dimensioned to receive the hollow housing 18 such that the outer shelf 30 can be rotated with respect to hollow housing 18 and marker 12.

The outer shell 30 is further dimensioned to cover hollow housing 18 and the body 14 of marker 12, but leaving the writing tip 16 exposed. The outer shell 30 has an open upper end 34, through which writing tip 16 projects, and may have a closed lower end 36.

It should be understood that the strip of eraser material 26 may be made of any suitable type of marker ink erasing material, and may have any suitable shape or relative dimensions. In the non-limiting example of FIGS. 1, 2A and 2B, the strip of eraser material 26 is shown as being elongated and extending axially with respect to the hollow housing 18. The slot 32 formed in outer shell 30 is correspondingly elongated and extends axially with respect to outer shell 30.

It is to be understood that the combination marker and eraser is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A combination marker and eraser, comprising:

a marker;

a hollow housing having an upper open end, a body of the marker being received within the hollow housing such that a writing tip of the marker is positioned exterior to the hollow housing;

a strip of eraser material immovably attached to an exterior surface of the hollow housing; and an outer shell rotatably mounted about the hollow housing, the outer shell having a slot formed therethrough such that rotation of the outer shell with respect to the hollow housing selectively either covers the strop of eraser material or exposes the strip of eraser material through the slot, wherein the body of the marker and the hollow housing have a matching contour and are dimensioned such that the body of the marker is fixedly secured within the hollow housing while leaving the writing tip exposed.

2. The combination marker and eraser as recited in claim 1, wherein a lower end of the hollow housing is closed.

3. The combination marker and eraser as recited in claim 1, further comprising a cap for releasably covering up the writing tip of the marker.

4. The combination marker and eraser as recited in claim 1, wherein the outer shell has an open upper end.

5. The combination marker and eraser as recited in claim 1, wherein the body of the marker has a cylindrical shape.

6. The combination marker and eraser as recited in claim 5, wherein the hollow housing has a cylindrical shape.

7. The combination marker and eraser as recited in claim 6, wherein outer shell has a cylindrical shape.

8. The combination marker and eraser as recited in claim 7, wherein the strip of eraser material extends axially with respect to the hollow housing.

9. The combination marker and eraser as recited in claim 8, wherein the slot extends axially with respect to the outer shell.

* * * * *